United States Patent Office 3,707,566
Patented Dec. 26, 1972

3,707,566
ARYLOXYPENTANE COMPOUNDS
Paul L. Creger and Winifred A. Neuklis, Ann Arbor, Mich., assignors to Parke, Davis & Company, Detroit, Mich.
No Drawing. Filed Mar. 30, 1970, Ser. No. 24,000
Int. Cl. C07c 43/20
U.S. Cl. 260—613 D       3 Claims

ABSTRACT OF THE DISCLOSURE

A series of 2,2-dimethyl-5-(2,5-xylyloxy)- and (3,5-xylyloxy)-1-pentanols, ether and ester derivatives, and structurally related nitriles and aldehydes. The compounds lower serum triglyceride levels. The 1-pentanol compounds can be produced by reducing the corresponding valeric acids or their salts or esters. The ether and ester derivatives can be produced by reacting the 1-pentanol compounds with an etherifying agent or esterifying agent. The nitriles can be produced by reacting a 3-aryloxypropyl halide with isobutyronitrile in the presence of a base. The aldehydes can be produced by reacting a substituted imine with a hydrolytic agent.

SUMMARY AND DETAILED DESCRIPTION

The present invention relates to new 2,2-dimethyl-5-aryloxypentane compounds. More particularly, the invention relates to new compounds of the formula

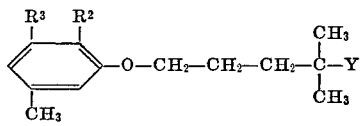

and to methods for their production. In this formula one of $R^2$ and $R^3$ represents hydrogen; the other of $R^2$ and $R^3$ represents methyl; and Y represents cyano (—CN), formyl (—CHO), or a group of the formula

—CH$_2$OR in which R represents hydrogen, lower alkyl, an acyl radical of a hydrocarbon carboxylic acid containing not more than 7 carbon atoms, or phenyl carbamoyl (C$_6$H$_5$NHCO—)

When R represents lower alkyl, it is a lower alkyl radical of preferably not more than 4 carbon atoms and is most suitably methyl.

In accordance with the invention, the carbinols of the invention, that is, the compounds wherein Y represents

—CH$_2$OR and R represents hydrogen, can be produced by reacting a compound of the formula

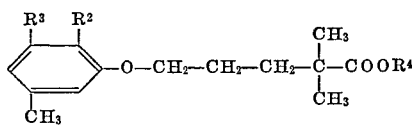

with a reducing agent; where $R^2$ and $R^3$ are as defined before and $R^4$ represents hydrogen, a salt-forming cation, or a lower alkyl radical of preferably not more than 4 carbon atoms. The preferred method of carrying out the reduction is by reacting the carboxylic acid, salt, or ester with a complex metal hydride followed by or accompanied by hydrolysis of the product. Some examples of suitable complex metal hydrides are lithium aluminum hydride, lithium aluminum hydride-aluminum chloride, sodium borohydride-aluminum chloride, and sodium bis (2-methoxyethoxy) aluminohydride. In the case where a lower alkyl ester is the starting material, it is also satisfactory to carry out the reduction with sodium borohydride or to use a non-hydride reducing agent such as sodium in ethanol. The preferred reducing agent is lithium aluminum hydride followed by hydrolysis of the product. Preferred solvents for use with most of the complex metal hydrides named above, are ethereal solvents such as diethyl ether, tetrahydrofuran, 1,2-dimethoxyethane, and diethylene glycol dimethyl ether. However, in the case of sodium borohydride, preferred solvents are water, dioxane, lower alkanols such as ethanol, and mixtures thereof. The required ratio of reactants depends on the particular starting materials used. For example, reduction with lithium aluminum hydride requires three-quarters of a mole of lithium aluminum hydride for each mole of carboxylic acid or one-half mole of lithium aluminum hydride for each mole of carboxylic acid ester. However, these calculated ratios are not normally employed as it is preferred to use a relatively large excess of the lithium aluminum hydride or other reducing agent. Thus, it is customary to use up to two moles of lithium aluminum hydride to reduce one mole of carboxylic acid or up to ten moles of sodium borohydride to reduce one mole of carboxylic acid ester. The time and temperature of the reaction are not particularly critical and likewise are dependent on the specific reactants employed. In general, the reaction is carried out at a temperature between 0° C. and 120° C. or the reflux temperature of the solvent, with lithium aluminum hydride reductions preferably carried out at about 35–65° C. and sodium borohydride reductions preferably carried out at about 75° C. The usual reaction time with lithium aluminum hydride is from 1 to 20 hours, optimally about 3 hours; and with sodium borohydride from 17 to 30 hours, optimally about 22 hours. Following reaction with a complex metal hydride in a non-aqueous solvent, the mixture is hydrolyzed with water or other aqueous medium and the product isolated. In other cases, the product can be isolated directly.

The 2,2-dimethyl-5-aryloxyvaleric acids, salts, and esters employed as starting materials in the foregoing process can be prepared by any of a variety of methods. For example, an alkali metal derivative of a compound of the formula

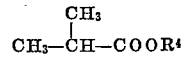

is reacted with an aryloxypropyl halide of the formula

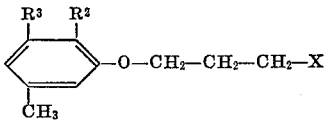

where $R^2$, $R^3$, and $R^4$ are as defined before and X represents halogen, preferably chlorine or bromine. The alkali metal derivative indicated above can be regarded as corresponding to the formula

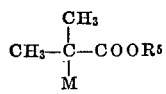

where M represents an alkali metal and $R^5$ represents a salt-forming cation or a lower alkyl radical. It is customarily prepared in situ by reacting isobutyric acid or a salt or ester of isobutyric acid with a strong base such as lithium diisopropylamide. The reaction is preferably carried out in an anhydrous ethereal solvent followed by hydrolyzing the mixture with water. When it is desired to isolate the product as an ester, prolonged exposure to the basic aqueous medium is avoided. In other cases, the product is isolated directly as a salt or, following acidification, as the free acid. These procedures are illustrated in greater detail hereinafter and in a co-pending application of Paul L. Creger, Ser. No. 819,126, filed Apr. 24, 1969.

Also in accordance with the invention, the lower alkyl ethers of the invention, that is, the compounds wherein Y represents

—CH$_2$OR and R represents lower alkyl; can be produced by reacting a compound of the formula

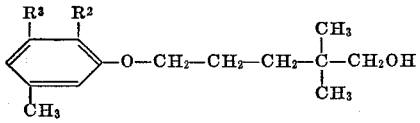

with a lower alkylating agent in the presence of a base; where R$^2$ and R$^3$ are as defined before. The preferred lower alkylating agents are esters of an alkanol having the formula

R$^6$—OH where R$^6$ represents an alkyl radical of preferably not more than 4 carbon atoms. Some examples of such esters are methyl iodide, ethyl bromide, ethyl iodide, isopropyl bromide, butyl chloride, butyl iodide, dimethyl sulfate, and methyl p-toluenesulfonate. Some examples of bases suitable for use in the reaction are sodium hydride, sodium amide, n-butyllithium, phenyllithium, and other strong bases of alkali metals. A preferred base is n-butyllithium. Some examples of solvents suitable for use in the reaction are diethyl ether, diethylene glycol dimethyl ether, dimethoxyethane, tetrahydrofuran, dimethylformamide, dimethyl sulfoxide, hexamethylphosphoramide, or an excess of the lower alkylating agent. A preferred solvent is dimethoxyethane. Although the reactants can be employed in approximately equimolar quantities, it is preferred to use an excess of the lower alkylating agent. The time and temperature of the reaction are not critical and depend somewhat on the reactants employed. In general, the reaction is carried out at a temperature from 0 to 150° C. or the reflux temperature of the solvent for from 2 to 48 hours. Using n-butyllithium as the base, the reaction is preferably carried out at a temperature of 0–35° C. for from 6 to 36 hours.

Further in accordance with the invention, the esters of the invention, that is, the compounds wherein Y represents

—CH$_2$OR and R represents an acyl radical of a hydrocarbon carboxylic acid containing not more than 7 carbon atoms, or phenylcarbamoyl; can be produced by reacting a compound of the formula

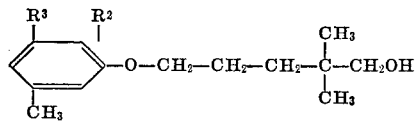

with a carboxylic acid of the formula

Ac—OH or a reactive derivative thereof, or phenyl isocyanate; where R$_2$ and R$_3$ are as defined before and Ac represents the acyl radical of a hydrocarbon carboxylic acid containing not more than 7 carbon atoms. Some examples of suitable reactive derivatives of the hydrocarbon carboxylic acids are the acid halides and the acid anhydrides. The reaction can be carried out in the absence of an added solvent although, in general, the use of a solvent is preferred. Some examples of suitable solvents are tertiary amines, tertiary amides, ethers, aromatic hydrocarbons, halogenated hydrocarbons, ethyl acetate, or an excess of acid anhydride reactant. Some examples of preferred solvents are toluene, xylene, or excess anhydride reactant. The reactants can be used in approximately equimolar quantities although, in many case, an excess of the carboxylic acid or it reactive derivative is preferred. In certain cases, it is desirable to carry out the reaction in the presence of a catalyst. When a hydrocarbon carboxylic acid is a reactant, a suitable catalyst is p-toluenesulfonic acid or other strong acid. When an acid halide or acid anhydride is a reactant, a suitable catalyst is a tertiary amine such as triethylamine or pyridine. The time and temperature of the reaction are dependent on the specific starting materials used. In general, the reaction is carried out between room temperature and 175° C. or the reflux temperature of the solvent for from 1 to 96 hours, the longer reaction times being used at the lower temperatures. The preferred temperature range is from 95 to 125° C. When one of the reactants is a hydrocarbon carboxylic acid, the progress of the reaction is conveniently followed by collecting the water formed in the reaction and continuing the reaction until the calculated amount of water has been collected.

Still further in accordance with the invention, the nitriles of the invention, that is, the compounds wherein Y represents cyano, can be produced by reacting a 3-aryloxypropyl halide of the formula

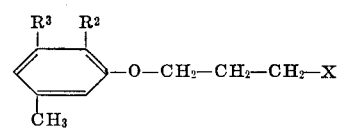

with isobutyronitrile in the presence of a base; where R$^2$ and R$_3$ are as defined before and X represents halogen. Some examples of suitable bases are alkali metal hydrides, alkali metal amides, alkali metal tertiary alkoxides, and alkali metal triphenylmethides. Preferred bases are lithium tertiary amides, especially lithium diethylamide or lithium diisopropylamide. Some examples of suitable solvents for the reaction are polar oxygenated solvents such as tetrahydrofuran, tetrahydropyran, dimethoxymethane, dimethoxyethane, diethylene glycol dimethyl ether, and dimethyl sulfoxide. Tetrahydrofuran is a preferred solvent for operating at lower temperatures and diethylene glycol dimethyl ether is a preferred solvent for operating at higher temperatures. The reactants can be used in approximately equimolar quantities, esecially when the base is a lithium tertiary amide. When using other bases such as sodium hydride, an excess of the 3-aryloxypropyl halide is preferred. Depending on the specific reactants employed, the reaction can be carried out over a wide range of conditions, for example at a temperature from —50 to 175° C. for from 1 hour to 130 hours. According to the preferred conditions, the reaction is carried out with a lithium tertiary amide at 0 to 30° C. for from 4 to 24 hours.

Yet further in accordance with the invention, the aldehydes of the invention, that is, the compounds wherein Y represents formyl, can be produced by reacting a compound of the formula

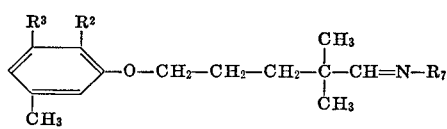

with a hydrolytic agent; where R$^2$ and R$^3$ are as defined before and R$^7$ represents a hydrocarbon radical or substituted hydrocarbon radical of not more than 10 carbon atoms. Some examples of hydrocarbon radicals which R$^7$ can represent are methyl, ethyl, isopropyl, butyl, tertiary butyl, hexyl, decyl, cyclopentyl, cyclohexyl, and methylcyclohexyl. When R$^7$ represents a substituted hydrocarbon radical the nature and number of substituents are unimportant as the group R$^7$ is lost during the course of the reaction. Preferred examples of R$^7$ are cyclohexyl and tertiary butyl. Some examples of suitable hydrolytic agents are water, aqueous solutions of mineral acids such as hydrochloric acid, phosphoric acid, or sulfuric acid, and aqueous solutions of organic acids such as acetic acid and p-toluenesulfonic acid. If desired, an organic solvent such as tetrahydrofuran, a lower alkanol, or a lower alkanone can also be present. A preferred hydrolytic agent is aqueous hydrochloric acid optionally in the presence of tetrahydrofuran or other organic solvent. At least the calculated amount and preferably a large excess of the hydrolytic agent is used. The time and temperature of the reaction are not especially critical. In general, the reaction is carried out at a temperature from 0 to 125° C. or the reflux temperature for from 1 hour to 24 hours, the longer reaction times being used at the lower temperatures. At a temperature of about 100° C. with dilute hydrochloric acid, the reaction is normally substantially complete within less than 4 hours.

Starting materials required for use in the foregoing process can be prepared in any of a number of ways. For example, an imine of the formula

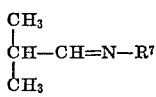

is reacted with a 3-aryloxypropyl halide of the formula

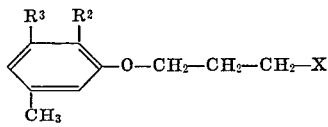

in the presence of lithium diisopropylamide to produce an imine employed as starting material in the process of the invention; where $R^2$, $R^3$, and $R^7$ are as defined before, and X represents halogen. If desired, the preparation of this starting material can be carried out in situ and the reaction with the hydrolytic agent can be carried out directly by treatment of the reaction mixture with, for example, dilute hydrochloric acid or other hydrolytic agent.

The compounds of the invention can exist in anhydrous form as well as in solvated, including hydrated, forms. In general, the hydrated forms and the solvated forms with pharmaceutically-acceptable solvents are equivalent to the anhydrous or unsolvated form for the purposes of the invention.

The compounds of the invention are new chemical substances, of value as pharmacological agents which reduce serum triglyceride levels. An important property of these compounds is that they reduce serum triglyceride levels without causing a corresponding reduction in serum chloesterol levels. The effectiveness of the compounds of the invention in lowering serum triglycerides can be demonstrated by standard methods. For example, male rats weighing 200–250 g. are maintained on a normal pellet diet. Each animal in a treatment group is given a daily oral dose of a test compound for 7 days. Commonly a test compound is first studied at a daily dose of 250 mg./kg. body weight; in subsequent groups of rats, the dose is progressively lowered until the compound no longer exhibits significant activity. An untreated control group is also maintained. At the end of the 7-day test period the animals are weighed and sacrificed, and the serum cholesterol and serum triglycerides are determined from blood samples taken from the vena cava. The methods used are described in "Journal of Laboratory and Clinical Medicine," 50, 318 (1957), and "Journal of Laboratory and Clinical Medicine," 50, 152 (1957). The test compound is considered to exhibit a side effect if the weight of the animals in the treatment group is significantly less than the weight of the animals in the control group. In representative determinations, the following compounds of the invention at the indicated daily dose levels for 7 days produced the indicated reduction of serum triglycerides with no effect on serum cholesterol or weight of the animals relative to the untreated control group. 2,2-dimethyl-5-(2,5-xylyloxy)-1-pentanol, 10 mg./kg. per day, 38% reduction of serum triglycerides; 2,2-dimethyl-5-(3,5-xylyloxy)-1-pentanol, 75 mg./kg. per day, 64% reduction of serum triglycerides; 2,2-dimethyl-5-(2,5-xylyloxy)valeronitrile, 250 mg./kg. per day, 39% reduction of serum triglycerides. Other compounds of the invention produce a significant reduction of serum triglycerides within the dosage range indicated above. Some of the preferred compounds of the invention are the carbinols mentioned above. In addition to administration by the oral route, as described above, the compounds of the invention can also be given by the parenteral route if desired.

The invention is illustrated by the following examples.

EXAMPLE 1

With stirring, a solution of 25.0 g. of 2,2-dimethyl-5-(2,5-xylyloxy)valeric acid in 50 ml. of ether is slowly added to a mixture of 4.5 g. of lithium aluminum hydride and 300 ml. of ether. The resulting mixture is heated at reflux for 3 hours, cooled, and treated successively with 5 ml. of water, 5 ml. of 15% sodium hydroxide solution, and 10 ml. of water. Insoluble inorganic material is removed by filtration. The filtrate is evaporated under reduced pressure to give a residue of 2,2-dimethyl-5-(2,5-xylyloxy)-1-pentanol. For purification, the product is distilled in vacuo; B.P. 115–117° C. at 20 microns; $n_D^{24}$ 1.5088.

By the foregoing procedure, with the substitution of 25.0 g. of 2,2-dimethyl-5-(3,5-xylyloxy)valeric acid for the 2,2-dimethyl-5-(2,5-xylyloxy)valeric acid, the product is 2,2-dimethyl-5-(3,5-xylyloxy)-1-pentanol; B.P. 117–118° C. at 70 microns; $n_D^{24}$ 1.5086.

EXAMPLE 2

With stirring at 0° C., 42 ml. of a 1.6 M solution of n-butyllithium in hexane is added to a solution of 15.8 g. of 2,2-dimethyl-5-(2,5-xylyloxy-1-pentanol in 250 ml. of dry dimethoxyethane. After an additional 15 minutes stirring at 0° C., 28.5 g. of methyl iodide is added. The mixture is stirred for 18 hours at room temperature. An additional 28.5 g. of methyl iodide is added and the mixture is stirred for 20 hours more. It is then diluted with 250 ml. of water. The organic phase is separated, combined with an ether extract of the aqueous phase, dried over anhydrous magnesium sulfate, and filtered. The filtrate is concentrated under reduced pressure to give a residue of 1-methoxy - 2,2 - dimethyl-5-(2,5-xylyloxy)-pentane. For purification, the product is distilled in vacuo; B.P. 103–104° C. at 60 microns; $n_D^{24}$ 1.4537.

By the foregoing procedure, with the substitution of 15.8 g. of 2,2-dimethyl-5-(3,5-xylyloxy)-1-pentanol for the 2,2-dimethyl-5-(2,5-xylyloxy)-1-pentanol, the product is 1-methoxy-2,2-dimethyl-5-(3,5-xylyloxy)pentane; B.P. 108–109° C. at 70 microns; $n_D^{24.5}$ 1.4956.

EXAMPLE 3

A mixture of 15.0 g. of 2,2-dimethyl-5-(2,5-xylyloxy)-1-pentanol and 33.1 g. of acetic anhydride is heated at reflux for 2 hours, cooled, and diluted with 200 ml. of water. The mixture is stirred for 2 hours and extracted with 200 ml. of hexane. The organic phase is separated and washed with water, with saturated aqueous sodium bicarbonate, and with water, dried over anhydrous magnesium sulfate, and filtered. The filtrate is concentrated under reduced pressure to give a residue of 2,2-dimethyl-5-(2,5-xylyloxy)-1-pentanol, acetate ester. For purification, the product is distilled in vacuo; B.P. 125–127° C. at 90 microns; $n_D^{25.5}$ 1.4891.

By the foregoing procedure, with the substitution of 15.0 g. of 2,2-dimethyl-5-(3,5-xylyloxy)-1-pentanol for the 2,2-dimethyl-5-(2,5-xylyloxy)-1-pentanol, the product is 2,2-dimethyl-5-(3,5-xylyloxy)-1-pentanol, acetate ester; B.P. 125–136° C. at 50 microns.

EXAMPLE 4

A mixture of 23.6 g. of 2,2-dimethyl-5-(2,5-xylyloxy)-1-pentanol, 12.8 g. of cyclohexanecarboxylic acid, 1.5 g. of p-toluenesulfonic acid monohydrate, and 250 ml. of toluene is heated at reflux for 18 hours with continuous removal of the water formed in the reaction. The mixture is cooled, diluted with 100 ml. of ether, washed with two 50 ml. portions of 2 N sodium hydroxide and with 100 ml. of saturated sodium chloride solution, dried over anhydrous magnesium sulfate, and filtered. The filtrate is concentrated in vacuo to give a residue of cyclohexanecarboxylic acid, 2,2 - dimethyl - 5 - (2,5-xylyloxy)pentyl ester. For purification, the product is distilled in vacuo; B.P. 160–162° C. at 7 microns; $n_D^{24}$ 1.5007.

EXAMPLE 5

A mixture of 15.0 g. of 2,2-dimethyl-5-(3,5-xylyloxy)-1-pentanol, 7.8 g. of benzoic acid, 1.0 g. of p-toluenesulfonic acid, and 200 ml. of toluene is heated at reflux for 62 hours with continuous removal of the water formed in the reaction. The mixture is cooled, diluted with 100 ml. of water, and washed with saturated aqueous sodium bicarbonate and with water. The organic phase is dried and concentrated in vacuo to give a residue of 2,2-dimethyl-5-(3,5-xylyloxy)-1-pentanol, benzoate ester; B.P. 168–171° C. at 40 microns; $n_D^{23.5}$ 1.5321.

EXAMPLE 6

A solution of 12.3 g. of 2,2-dimethyl-5-(2,5-xylyloxy)-1-pentanol, 6.21 g. of phenyl isocyanate, and 200 ml. of toluene is heated at reflux for 62 hours. The mixture is concentrated under reduced pressure to give a residue of 2,2 - dimethyl - 5-(2,5-xylyloxy)-1-pentanol, carbanilate ester. For purification, the product is distilled in vacuo; B.P. 187–201° C. at 70 microns; $n_D^{25}$ 1.5390; M.P. 60–62° C.

EXAMPLE 7

With stirring and cooling at 0–10° C., 248 ml. of a 1.61 M solution of n-butyllithium in hexane is slowly added to a solution of 40.4 g. of diisopropylamine in 350 ml. of anhydrous tetrahydrofuran. The resulting mixture contains lithium diisopropylamide. After 10 minutes, 27.6 g. of isobutyronitrile is added and after an additional 15 minutes, 97.3 g. of 3-bromopropyl 2,5-xylyl ether (also known as 3-(2,5-xylyloxy)propyl bromide) is added, the additions being made at such a rate that a temperature of 0–10° C. is maintained. The resulting mixture is stirred at 30° C. for 18 hours and then diluted with 250 ml. of water. The organic phase is separated, dried over anhydrous magnesium sulfate, and filtered. The filtrate is concentrated under reduced pressure to give a residue of 2,2-dimethyl-5-(2,5-xylyloxy)valeronitrile. For purification, the product is distilled in vacuo; B.P. 114–120° C. at 60 microns; $n_D^{25}$ 1.4975.

By the foregoing procedure, with the substitution of 97.3 g. of 3-bromopropyl 3,5-xylyl ether (also known as 3-(3,5-xylyloxy)propyl bromide) for the 3-bromopropyl 2,5-xylyl ether, the product is 2,2-dimethyl-5-(3,5-xylyloxy)valeronitrile; B.P. 115–120° C. at 50 microns; $n_D^{25.5}$ 1.5005.

EXAMPLE 8

With stirring and cooling at 0–10° C., 248 ml. of a 1.61 M solution of n-butyllithium in hexane is added to a solution of 40.4 g. of diisopropylamine in 350 ml. of anhydrous tetrahydrofuran. After 10 minutes, 61.4 g. of N-(isobutylidene)cyclohexylamine is added and after an additional 15 minutes, 97.3 g. of 3-bromopropyl 2,5-xylyl ether (also known as 3-(2,5-xylyloxy)propyl bromide) is added, the additions being made at such a rate that a temperature of 0–10° C. is maintained. The resulting mixture is stirred at 30° C. for 18 hours. The mixture, which now contains N - [2,2 - dimethyl-5-(2,5-xylyloxy)pentylidene]cyclohexylamine is heated at reflux for 4 hours with 300 ml. of 3 N hydrochloric acid. It is then cooled and extracted with ether. The ether extract is washed with saturated sodium chloride solution, dried over anhydrous magnesium sulfate, and filtered. The filtrate is concentrated under reduced pressure to give a residue of 2,2-dimethyl-5-(2,5-xylyloxy)valeraldehyde. For purification, the product is distilled in vacuo; B.P. 98–104° C. at 30 microns.

By the foregoing procedure, with the substitution of 97.3 g. of 3-bromopropyl 3,5-xylyl ether (also known as 3-(3,5-xylyloxy)propyl bromide) for the 3-bromopropyl 2,5-xylyl ether, the product is 2,2-dimethyl-5-(3,5-xylyloxy)valeraldehyde; B.P. 100–103° C. at 20 microns; $n_D^{25}$ 1.5020.

Starting materials

With stirring, 44.1 g. of isobutyric acid is added to a mixture of 51.0 g. of diisopropylamine, 23.2 g. of a 57% sodium hydride dispersion in mineral oil, and 350 ml. of tetrahydrofuran. When gas evolution subsides, the mixture is heated at reflux for 15 minutes, cooled to 0° C., and treated with 345 ml. of a 1.45 M solution of n-butyllithium in heptane. After 5 hours, the mixture is warmed one-half hour at 30° C., cooled to 0° C., and treated with 122.0 g. of 3-(2,5-xylyloxy)propyl bromide (also known as 3-bromopropyl 2,5-xylyl ether). After one more hour, it is stirred with 500 ml. of water and the aqueous phase is separated and acidified with 150 ml. of 6 N hydrochloric acid. The acidic mixture is extracted with ether and the ether extract is washed with saturated sodium chloride solution, dried over magnesium sulfate, concentrated almost to dryness, and distilled in vacuo. A distillate of 2,2-dimethyl-5-(2,5-xylyloxy)valeric acid is collected at B.P. 158–159° C. at 0.02 mm. of Hg; M.P. 61–63° C. following crystallization from hexane.

The same product is obtained by substituting 4.4 g. of lithium hydride for the sodium hydride in the above procedure.

The same product is also obtained in the following manner. A mixture of 26.4 g. of isobutyric acid, 6.0 g. of magnesium oxide powder, and 250 ml. of toluene is stirred and heated at reflux with continuous removal of the water formed in the reaction. When water formation ceases, the resulting mixture containing magnesium isobutyrate is concentrated to one-half its original volume, cooled in an ice bath, and treated with 31.0 g. of diisopropylamine in 200 ml. of dry tetrahydrofuran and then with 179 ml. of 1.68 M n-butyllithium in heptane while the temperature is maintained below 10° C. After 15 more minutes, the mixture is warmed at 30° C. for one-half hour, cooled to 0–10° C., and treated with 75.0 g. of 3-(2,5-xylyloxy)propyl bromide. The mixture is then stirred for 18 hours at room temperature and diluted with 125 ml. of 6 N hydrochloric acid and 250 ml. of water. The organic phase is separated, concentrated, and the residue distilled in vacuo to give 2,2-dimethyl-5-(2,5-xylyloxy) valeric acid.

With stirring, 33.0 g. of dry sodium isobutyrate (prepared from isobutyric acid and sodium hydroxide) is added to a solution of 31.0 g. of diisopropylamine in 300 ml. of anhydrous tetrahydrofuran. With external cooling to maintain the temperature below 10° C., 217 ml. of 1.45 M solution of n-butyllithium in heptane is added. The mixture is then stirred at 30° C. for one-half hour and treated with 75.0 g. of 3-(3,5-xylyloxy)propyl bromide (also known as 3-bromopropyl 3,5-xylyl ether) dissolved in tetrahydrofuran. After 15 minutes, the mixture is allowed to warm to room temperature and stirring is continued for 16 hours. The mixture is hydrolyzed with 500 ml. of water and the aqueous phase is separated, washed with 200 ml. of ether, and acidified with 6 N sulfuric acid to give 2,2-dimethyl-5-(3,5-xylyloxy)valeric acid as an insoluble product. For purification, the product is dissolved in ether and the ether solution is washed with water, dried over magnesium sulfate, and evaporated. The product is crystallized from hexane; M.P. 92–93° C.

We claim:
1. A compound of the formula

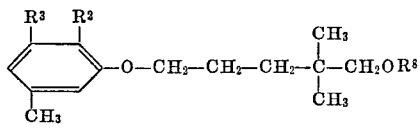

where one of $R^2$ and $R^3$ is hydrogen; the other of $R^2$ and $R^3$ is methyl; and $R^8$ is a member of the class consisting of hydrogen and a lower alkyl.

2. A compound alcording to claim 1 which is 2,2-dimethyl-5-(2,5-xylyloxy)-1-pentanol.

3. A compound according to claim 1 which is 2,2-dimethyl-5-(3,5-xylyloxy)-1-pentanol.

References Cited

UNITED STATES PATENTS 2,542,937   2/1951   Miescher et al. __ 260—613 D X
3,362,997   1/1968   Bolhofer _____ 260—613 D X

OTHER REFERENCES

Ludwig et al., Jour. Amer. Chem. Soc., vol. 74 (1952), 1935–1939.

BERNARD HELFIN, Primary Examiner

U.S. Cl. X.R.

260—465 F, 468 R, 471 R, 476 R, 488 CD, 521 R, 566 R, 600, 999; 424— 34, 304